Patented Dec. 20, 1949

2,491,572

UNITED STATES PATENT OFFICE 2,491,572

METHYLENE CHLORIDE IN THE OXIDATION OF ALDEHYDES TO ACID ANHYDRIDES

Samuel B. McFarlane, Summit, N. J., assignor to Celanese Corporation of America, a corporation of Delaware No Drawing. Application September 10, 1947, Serial No. 773,289

3 Claims. (Cl. 260—546)

This invention relates to the oxidation of aliphatic aldehydes and relates more particularly to the continuous catalytic oxidation of aliphatic aldehydes to form aliphatic anhydrides.

An object of this invention is to provide an improved process for the continuous production of aliphatic acid anhydrides in high yield by the continuous catalytic oxidation of aliphatic aldehydes.

Another object of this invention is the provision of an improved process for the catalytic oxidation of aliphatic aldehydes to the corresponding aliphatic acid anhydrides wherein the water formed as a product of said aldehyde oxidation is continuously removed from the oxidation reaction zone as formed.

Other objects of this invention will appear from the following detailed description.

In the catalytic oxidation of aliphatic aldehydes to the corresponding anhydrides with free oxygen, water is a by-product of the reaction and must be removed from the reaction mixture in order to avoid hydrolysis of the anhydride produced, thus causing a corresponding reduction in yield. Usually, the oxidation is effected in a suitable reactor or convertor and the reaction products then removed and subjected to some form of distillation to separate the water, unreacted aldehyde and any acid which has formed from the anhydride. This process requires a series of distillation columns and involves the condensation and revaporization of the reaction product which is quite uneconomical.

I have now found that the catalytic oxidation of aliphatic aldehydes to the corresponding aliphatic acid anhydride with free oxygen may be carried out efficiently while employing but a single reaction zone if methylene chloride is introduced into the reaction zone containing the oxidation catalyst and the aliphatic aldehyde undergoing oxidation, and an azeotrope comprising the water of reaction and methylene chloride distilled from one part of said reaction zone while the aliphatic anhydride formed is simultaneously removed from another part of said reaction zone. The water-methylene chloride azeotrope comprises about 7.2% by volume of water and 92.8% by volume of methylene chloride. When condensed, the azeotrope separates due to the mutual insolubility of the water and methylene chloride. The methylene chloride is recycled to the reaction zone and the water layer discarded. The anhydride which is removed from the reaction zone is also preferably partly recycled to ensure complete oxidation of any unoxidized aldehyde therein. When equilibrium conditions are reached, the side-stream of aliphatic anhydride taken from the anhydride recycle stream contains from 15 to 50% by weight of anhydride, the remainder comprising unreacted aliphatic aldehyde and some aliphatic acid. My novel process may be employed for the oxidation of various aliphatic aldehydes to the corresponding acid anhydride such as, for example, the oxidation of propionaldehyde to propionic anhydride or the oxidation of butyric aldehyde to butyric anhydride.

Thus, for example, in effecting the catalytic oxidation of propionaldehyde to propionic anhydride in accordance with my novel process, the propionaldehyde to be oxidized is fed to the middle of the reaction zone in admixture with 0.2 to 2.0% by weight of a mixture of cobalt acetate and copper acetate on the weight of the propionaldehyde, the latter being introduced in solution in propionic acid. The metal acetates comprise the oxidation catalyst and are usually employed in a ratio of 40 to 60% by weight of cobalt acetate to 60 to 40% by weight of copper acetate. Air or oxygen together with methylene chloride is simultaneously introduced into the bottom of the reaction zone. Heat is supplied to the base of the reaction zone by means of a suitable steam coil. The heat acts to vaporize the methylene chloride and is so controlled that the temperature at the top of the reaction zone does not exceed about 38.5° C. This is the boiling point of the water-methylene chloride azeotrope which forms when the by-product water which is produced by the oxidation of the propionaldehyde to propionic anhydride vaporizes with the methylene chloride present. Allowing the temperature to exceed 38.5° C. causes some unreacted propionaldehyde to distill over with said azeotrope and creates a complicated recovery problem.

The propionic anhydride formed is removed at the base of the reaction zone and is preferably recycled to the middle of the reaction zone to ensure complete oxidation of any propionaldehyde present therein. After equilibrium conditions are reached, a side-stream of propionic anhydride is continuously withdrawn from the recycle, the catalyst removed therefrom and a highly purified product may be obtained by fractionally distilling this product. Propionic anhydride yields of 25 to 90% on the weight of the propionaldehyde fed to the reaction zone are obtained, the greater the recycle the higher the yield.

In order further to illustrate my invention, but without being limited thereto, the following example is given:

Example

A mixture comprising one part by weight of propionaldehyde and one part by weight of propionic acid containing 1% by weight on the propionaldehyde of a mixture of cobalt acetate and copper acetate, is fed into the middle of a packed fractionating column equivalent to 25 theoretical plates, or fractionating column containing 25 plates, while at the same time gaseous oxygen or air and one part by weight of methylene chloride are introduced into the bottom of the column. Heat is supplied by means of a steam coil in a reboiler at the base of the column. The catalytic oxidation of the propionaldehyde fed to the column to propionic anhydride takes place with the formation of water. The water vapor and vaporized methylene chloride pass upward through the column and distill over in the form of an azeotrope which boils at 38.5° C. The heat supplied to the column is carefully regulated so that the temperature at the head of the column does not exceed this figure. The propionic anhydride formed passes down the column to the reboiler together with some catalyst, propionic acid, and propionaldehyde, and the mixture in the reboiler is then recycled to the middle of the column. When equilibrium is reached a side-stream of the propionic anhydride product is taken off the recycle. The propionic anhydride obtained is of 45% purity, and any catalyst, propionaldehyde or propionic acid present is removed by redistillation. The methylene chloride-water azeotrope is condensed, divided in a decanter and the methylene chloride recycled to the fractionating column. The water is discarded.

My novel process is highly efficient and economical and, since the entire oxidation reaction and water removal may be conducted in but a single fractionating column, the capital investment required is far less than that of those aldehyde oxidation processes heretofore known.

It is to be understood that the foregoing detailed description is given merely by way of illustration and that many variations may be made therein without departing from the spirit of my invention.

Having described my invention, what I desire to secure by Letters Patent is:

1. Process for the direct oxidation of saturated lower aliphatic aldehydes to saturated lower aliphatic acid anhydrides, which comprises feeding a mixture of equal parts by weight of the saturated lower aliphatic aldehyde and the saturated lower aliphatic acid anhydride containing an oxidation catalyst comprising 0.2 to 2.0% on the weight of the saturated lower aliphatic aldehyde of an equal mixture of cobalt acetate and copper acetate to a reaction zone, simultaneously introducing oxygen and methylene chloride into said reaction zone, distilling an azeotrope consisting of water and methylene chloride from one part of said reaction zone and removing the saturated lower aliphatic acid anhydride from another part of said reaction zone.

2. Process for the direct oxidation of propionaldehyde to propionic anhydride, which comprises feeding a mixture of equal parts by weight of propionaldehyde and propionic acid containing an oxidation catalyst comprising 0.2 to 2.0% on the weight of the propionaldehyde of an equal mixture of cobalt acetate and copper acetate to a reaction zone, simultaneously introducing oxygen and methylene chloride into said reaction zone, distilling an azeotrope consisting of water and methylene chloride from one part of said reaction zone and removing propionic anhydride from another part of said reaction zone.

3. Process for the direct oxidation of butyraldehyde to butyric anhydride, which comprises feeding a mixture of equal parts by weight of butyraldehyde and butyric acid containing an oxidation catalyst comprising 0.2 to 2.0% on the weight of the butyraldehyde of an equal mixture of cobalt acetate and copper acetate to a reaction zone, simultaneously introducing oxygen and methylene chloride into said reaction zone, distilling an azeotrope consisting of water and methylene chloride from one part of said reaction zone and removing butyric anhydride from another part of said reaction zone.

SAMUEL B. McFARLANE.

REFERENCES CITED

The following references are of record in the file of this patent:

UNITED STATES PATENTS

| Number | Name | Date |
| --- | --- | --- |
| 1,815,802 | Schleicher | July 21, 1931 |
| 2,002,085 | Dreyfus | May 21, 1935 |
| 2,075,026 | Dreyfus et al. | Mar. 30, 1937 |
| 2,177,494 | Losch et al. | Oct. 24, 1939 |
| 2,293,104 | Bludworth | Aug. 18, 1942 |
| 2,298,354 | Dreyfus | Oct. 13, 1942 |

FOREIGN PATENTS

| Number | Country | Date |
| --- | --- | --- |
| 443,151 | Great Britain | Feb. 14, 1936 |
| 39,445 | Netherlands | Nov. 16, 1936 |
| 510,959 | Great Britain | Aug. 10, 1939 |
| 540,915 | Great Britain | Nov. 5, 1941 |